Aug. 13, 1957  S. W. BENGTSSON  2,803,002
DIRECTIONS INDICATORS
Filed Nov. 27, 1953  3 Sheets-Sheet 1
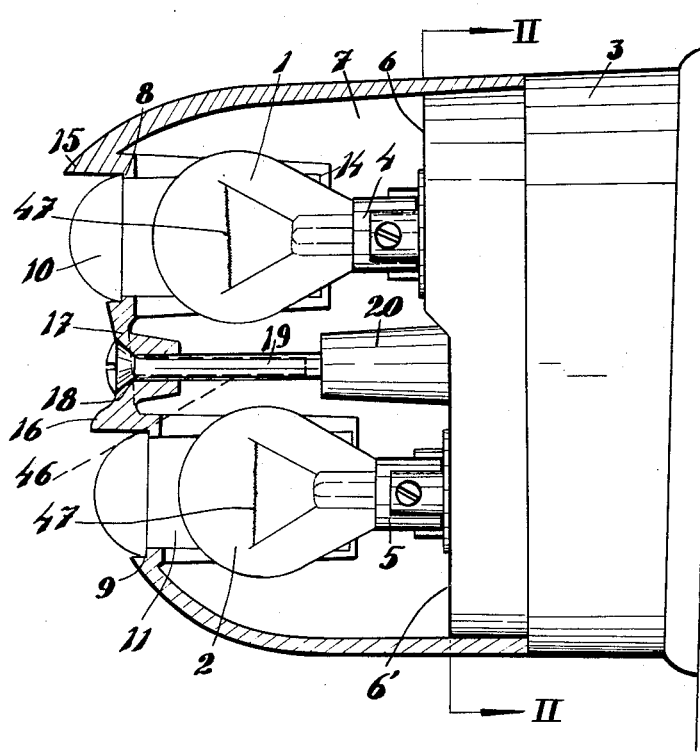
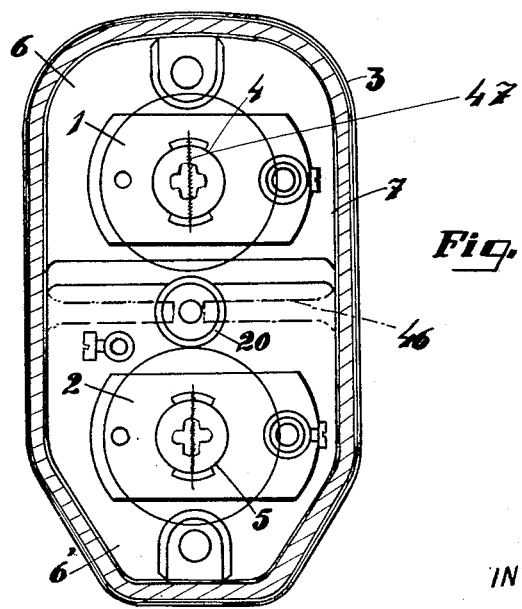
INVENTOR
SIGURD WALTER BENGTSSON
By Linton and Linton
ATTORNEYS Aug. 13, 1957 S. W. BENGTSSON 2,803,002
DIRECTIONS INDICATORS
Filed Nov. 27, 1953 3 Sheets-Sheet 2

INVENTOR
SIGURD WALTER BENGTSSON
By Linton and Linton
ATTORNEYS

INVENTOR
SIGURD WALTER BENGTSSON
By Linton and Linton
ATTORNEYS

2,803,002

DIRECTIONS INDICATORS

Sigurd Walter Bengtsson, Langedrag, Sweden

Application November 27, 1953, Serial No. 394,831

Claims priority, application Sweden November 26, 1952

1 Claim. (Cl. 340—83)

The present invention relates to a direction indicator for road vehicles, said indicator being entirely based upon optical effects and having consequently no arms or similar arrangements for signalling purposes. According to the invention, the indicator is provided with two sources of light, by which the signals are given, and is characterized in that one of the sources of light is positioned above the other, and that the sources of light are adapted to be connected to a source of current by means of a contact arrangement of such a character that both sources of light will burn with flashing light, and the flashing light signals of one of the light sources occur in intervals between the flashing light signals of the other light source.

The direction indicator is thus given a so-called "jumping" light, which is well adapted to draw attention to itself in a manner similar to lighted movable arms. The sources of light are enclosed in a casing with window openings covered by windows or lenses in such a way that the sources of light are well protected against mechanical influence from outside, and against snow, ice and wet, in such a way that the direction indicators on vehicles, for example tram cars and omnibuses, which are moved through a washing machine in order to be cleaned cannot be damaged.

An embodiment of the invention is shown in the accompanying drawings, in which:

Figure 1 is a side view of the direction indicator with the casing enclosing the sources of light in vertical section.

Figure 2 is a vertical section on the line II—II in Figure 1.

Figure 3:
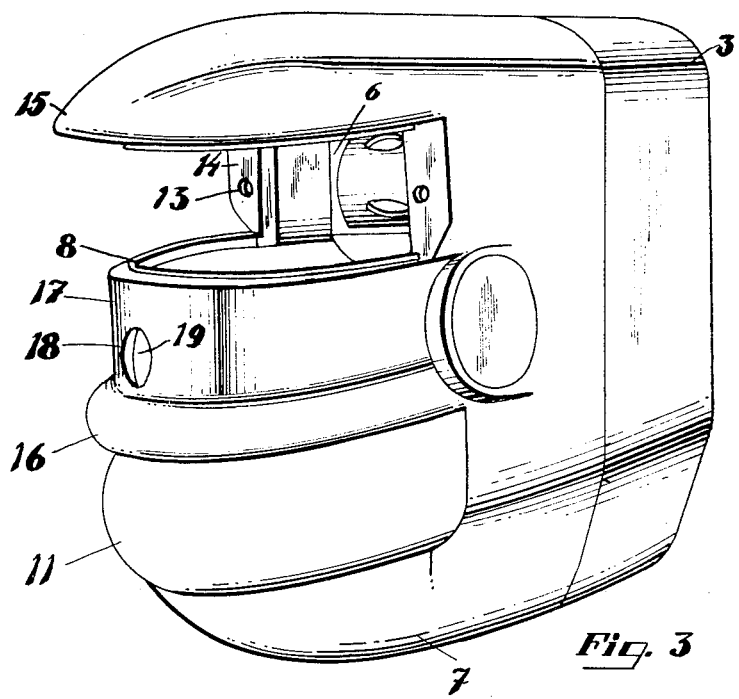
Figure 3 is a perspective view of the casing for the two sources of light, the upper source of light and the window for the same being removed.
Figure 4:
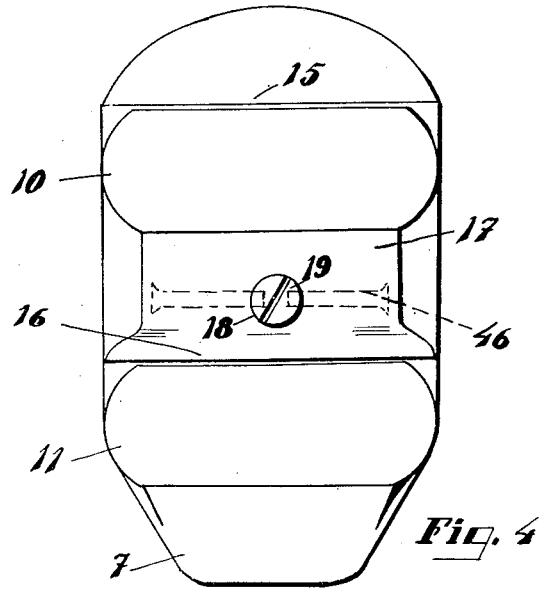
Figure 4 is a front view of the direction indicator.
Figure 5:
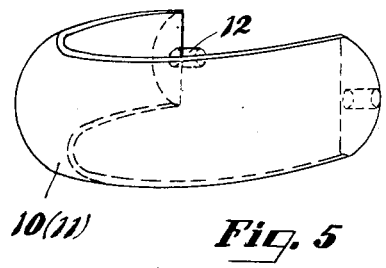
Figure 5 is a perspective view of one of the windows.

In the drawings, 1 and 2 denote two electrical lamps, one 1 of which is situated above the other 2, and which are carried by the base 3 with lamp sockets 4 and 5 respectively of suitable character horizontally projecting from a side surface of the base. As appears from Figure 1, the lamp socket 4 is fastened to a base surface 6, which is located in another vertical plane than the base surface 6' to which the other lamp socket 5 is fastened. A casing 7 made from non-transparent material enclosing the lamps and provided with window openings 8 and 9 respectively for the lamps, is fastened to the base 3. The front wall of the casing has a convex outer side with a substantially semi-cylindrical shape, the winding openings 8, 9 extending over a horizontal arc of about 180°. These window openings are adapted to be closed by windows 10 and 11 respectively of corresponding arc-shape, which windows may be formed as lenses. These windows may be made from synthetic resin, the ends of the curved windows being formed with pins 12, which are adapted to be inserted into holes 13 of the lugs or offsets 14, which limit the window opening backwards, and the pins can be secured in the holes by welding or gluing. Above each window opening, the casing is provided with a shield-shaped portion 15 and 16 respectively, intended to prevent reflexes of light from outer light sources, and also to form a drip moulding above the windows.

The curved or semi-cylindrical portion 17 of the casing between the two window openings is provided with a hole 18 for a screw 19 adapted to be screwed into a sleeve 20 fastened to the base so that the casing will thereby be connected with the base.

The spaces for the lamps within the casing are provided by means of a wall or a shield 46 shielded on both sides of screw 19, said wall or shield preventing light from the upper lamp 1 escaping through the window 10 for the lower lamp, and vice versa.

The heating filaments 47 of the lamps 1, 2 are substantially vertical and, thus, perpendicular to the optical principal axis of the systems of lamps and lenses. The light signal thereby attains convenient diffusion.

Figure 6:
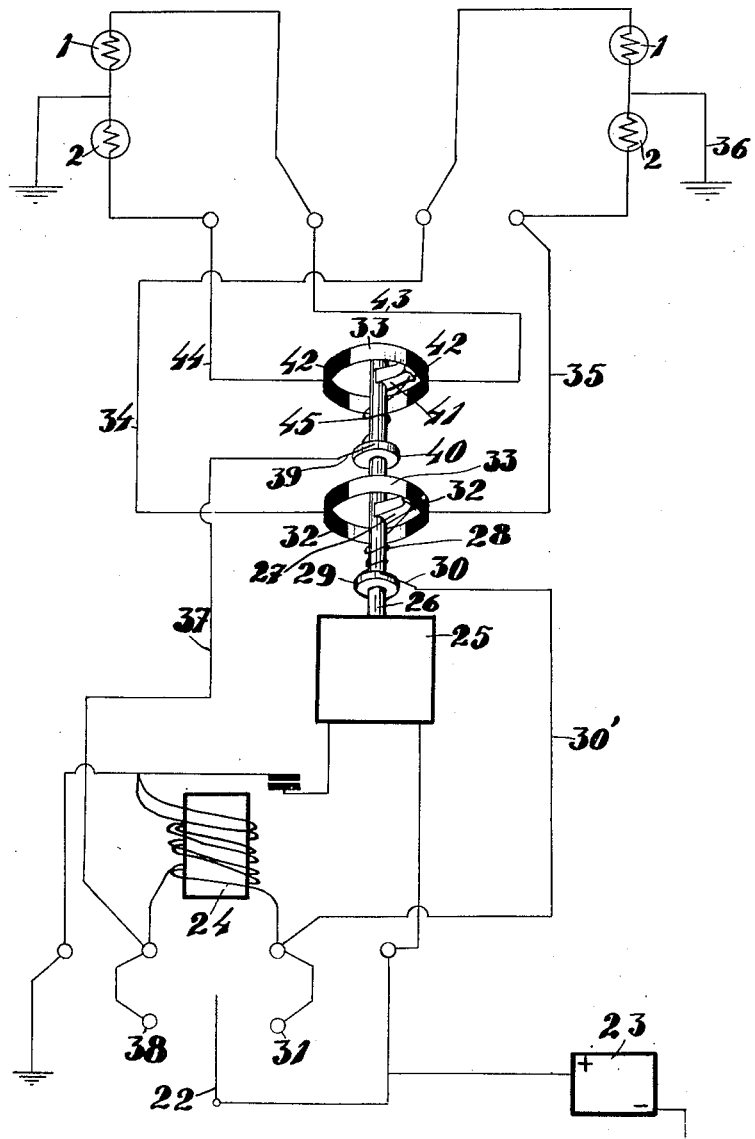
Figure 6 is a wiring diagram showing the supply of current to the electrical sources of light.

When signalling, the two sources of light 1, 2 will flash alternately with a suitable frequence, for example, about 80 flashes per minute. By this alternate lighting and extinguishing of the source of light, the image of a moving light with "jumping" character, and a very attractive effect is produced, which makes it particularly suitable as a traffic signal. As least one direction indicator of this kind is intended to be placed on both the left and right sides 21 of the vehicle in such a way that the axes of the light beams are horizontal or directed obliquely downwards with a small angle to the horizontal plane. When the direction indicator on the right side of the vehicle is lit, this indicates that the vehicle is to make a left-turn. The desired alternate lighting of the lamps 1, 2, is effected by means of a switch device with suitable electrical means as shown by way of an example by the wiring diagram of Figure 6. In this figure a movable contact arm 22 is connected to one of the poles of a source of current 23, the other pole of which is earthed (connected to the body of the vehicle). When the contact arm 22 is moved to the right, the current is allowed to pass to the direction indicator on the right side of the vehicle through an electromagnetical relay 24 and to an electromotor, the shaft of which is caused to rotate and which by a speed reducing gear, for example a worm gear not shown, rotates shaft 26. To this shaft a sliding contact 27 is fastened, this contact by a lead 28, a contact ring 29, a sliding contact 30, and a lead 30' being connected to the stationary contact part 31 of the right side contact position. The sliding contact 27 co-operates with two stationary curved contact parts 32 separated from each other by insulating parts 33. The contact parts 32 are located diametrically opposite each other and occupy for example, each an arc of 90°. One of the contact arcs is connected to the upper lamp 1 through a lead 34, and the other of the contact arcs is connected through a lead 35 to the lower lamp 2 of the direction indicator placed on the right side of the vehicle. Both lamps are connected through an earth connection 36 with the other pole of the source of current. Thus, when the contact arm 22 is moved to the right, both lamps of the direction indicator of the right side are lit and extinguished alternately in such a way that one lamp lights in the dark intervals of the other lamp. The dark interval may be made considerably shorter than the light interval in such a way that one of the lamps is lit approximately at the same time as the other lamp is extinguished. When the contact arm 22 is moved to the neutral position shown in Figure 6, the current to the motor and lamps is of course shut off.

When the contact arm 22 is moved to the left contact position, the current is allowed to pass through the electromagnetic relay 24 to the electromotor 25 and through a lead 37 from the left stationary contact part 38 to a sliding contact 39 on a contact ring 40 on the shaft 26. This contact ring through a lead 45 is connected with a sliding contact 41 on said shaft, which sliding contact, in the rotation of the shaft, alternately co-operates with two contact portions 42 which are of the same character as the contact parts 32 previously mentioned. The contact parts 42 through leads 43 and 44 are connected with the lamps 1 and 2 respectively of the direction indicator placed on the left side of the vehicle and thus, said lamps will be lit and extinguished alternately. Thus, the signals on the left and right side of the vehicle respectively will be mutually entirely alike.

Each lamp flashes for example with 80 flashes per minute, and the flashes of one of the lamps will occur in the intervals between the flashes of the other lamp, whereby a "jumping" flashlight is obtained. It does not influence the other lamp, if one of the lamps is burnt out or becomes inoperative in another way, for the other lamp, when current is supplied thereto, will flash with the same flashing frequency as before. Even if the signal hereby becomes defective it will not be necessary to take the vehicle with the defective direction indicator out of traffic immediately. For change of a lamp, it is only necessary to unscrew the screw 19 to enable the removal of the casing from the base so that the lamps are accessible.

The windows and lenses preferably are made from synthetic resin which has good transparency and is weatherproof and has slight power of absorption of water and, of course the lenses are formed so as to give as good optical effect as possible.

The invention is not limited to the embodiments above described. Each lamp may, for example, during each period of light show two or even more flashes. If such an action is desired it is only necessary to divide the contact arcs 32 and 42 respectively into two or more arc portions insulated from each other. The casing for the lamps may be shaped in another way than shown in the drawings.

What I claim is:

A casing for electric lamp illuminated direction indicator for producing jumping light signals comprising a hollow casing having an open side and being formed of an opaque material, a base detachably connected to and closing the open side of said casing, a pair of lamp sockets mounted on said base and positioned one above the other extending inwardly of said housing, said housing having a convex wall of a substantially semi-cylindrical configuration forming the porton of said housing diametrically opposite to said open side thereof, said housing convex wall having a pair of window openings each extending on an arc of about 180° and each positioned opposite one of said lamp sockets, a portion of said convex wall being positioned between said window openings spacing said openings apart and said wall portion being of substantially the same width as each of said window openings, a pair of windows each of an arc-shape similar to one of said window openings and detachably connected to and positioned in one of said openings closing the same, and each of said windows having a convex wall on the side thereof opposite its respective housing opening opposing lamp socket.

References Cited in the file of this patent

UNITED STATES PATENTS

| | | |
|---|---|---|
| 1,304,423 | Walker | May 20, 1919 |
| 1,570,673 | Johns | Jan. 26, 1926 |
| 1,771,566 | Anderson | July 29, 1930 |
| 2,221,178 | Best | Nov. 12, 1940 |
| 2,233,514 | Buchanan | Mar. 4, 1941 |
| 2,245,790 | Koubek | June 17, 1941 |
| 2,273,747 | Adler | Feb. 17, 1942 |
| 2,300,896 | Hosmer | Nov. 3, 1942 |
| 2,573,926 | Ogden | Nov. 6, 1951 |
| 2,679,635 | Hart | May 25, 1954 |

FOREIGN PATENTS

| | | |
|---|---|---|
| 154,970 | Switzerland | Aug. 16, 1932 |
| 551,616 | France | Jan. 11, 1923 |